(12) United States Patent
Chung et al.

(10) Patent No.: US 11,686,033 B2
(45) Date of Patent: Jun. 27, 2023

(54) LAUNDRY TREATING APPARATUS

(71) Applicant: LG ELECTRONICS INC., Seoul (KR)

(72) Inventors: Bosun Chung, Seoul (KR); Doyoung Rhyu, Seoul (KR); Jong Min Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 360 days.

(21) Appl. No.: 16/984,571

(22) Filed: Aug. 4, 2020

(65) Prior Publication Data

US 2021/0071341 A1 Mar. 11, 2021

(30) Foreign Application Priority Data

Sep. 9, 2019 (KR) .................. 10-2019-0111649

(51) Int. Cl.
*D06F 37/26* (2006.01)
*D06F 23/04* (2006.01)
*D06F 37/24* (2006.01)
*F16F 15/02* (2006.01)
*F16F 13/00* (2006.01)

(52) U.S. Cl.
CPC ............ *D06F 37/268* (2013.01); *D06F 23/04* (2013.01); *D06F 37/24* (2013.01); *F16F 13/005* (2013.01); *F16F 15/022* (2013.01); *F16F 2230/0023* (2013.01); *F16F 2230/0035* (2013.01); *F16F 2230/0052* (2013.01)

(58) Field of Classification Search
CPC ........ D06F 37/24; D06F 37/268; D06F 23/04; F16F 13/005; F16F 15/022; F16F 2230/0023; F16F 2230/0035; F16F 2230/0052

USPC .......................................................... 68/212
See application file for complete search history.

(56) References Cited

U.S. PATENT DOCUMENTS

2011/0308281 A1 12/2011 Yu et al.
2016/0010259 A1* 1/2016 Jeon ...................... D06F 37/245
68/132

FOREIGN PATENT DOCUMENTS

| CN | 103572550 | 2/2014 |
| CN | 103668862 | 3/2014 |
| CN | 105316898 | 2/2016 |
| CN | 105316899 | 2/2016 |
| CN | 105839348 | 8/2016 |
| CN | 107663741 | 2/2018 |
| JP | 2006122467 | 5/2006 |
| JP | 2016154705 | 9/2016 |
| KR | 20010001014 | 1/2001 |
| KR | 20060005579 | 1/2006 |

(Continued)

OTHER PUBLICATIONS

Office Action in Chinese Appln. No. 202010795487.2, dated Jul. 22, 2022, 20 pages (with English translation).

*Primary Examiner* — Tinsae B Ayalew
(74) *Attorney, Agent, or Firm* — Fish & Richardson P.C.

(57) ABSTRACT

A laundry treating apparatus includes a main body, a washing tub, and a suspension assembly. The suspension assembly includes a support rod, an elastic member, and a damper. The damper includes a cap, a housing, and a friction member. The friction member is disposed in both the cap and the housing, and is configured to press the support rod through the coupling of the female coupling portion and the male coupling portion.

16 Claims, 15 Drawing Sheets

(56) References Cited

FOREIGN PATENT DOCUMENTS

| KR | 100742646 | 7/2007 |
| KR | 20120029853 | 3/2012 |
| KR | 20120072833 | 7/2012 |

* cited by examiner

LAUNDRY TREATING APPARATUS

CROSS-REFERENCE TO RELATED APPLICATION

The present application claims benefit of priority to Korean Patent Application No. 10-2019-0111649, entitled "LAUNDRY TREATING APPARATUS," filed on Sep. 9, 2019, the entirety of which is incorporated by reference herein.

BACKGROUND

1. Technical Field

The present disclosure relates to a laundry treating apparatus, and more particularly, to a laundry treating apparatus capable of improving both performance of supporting a load of a washing tub and performance of dampening vibration occurring during operation of the washing tub.

2. Description of Related Art

In general, laundry requires several forms of treatment, such as washing, drying, storing, and ironing. To this end, laundry treating apparatuses that separately perform the treatments such as washing, drying, storing and ironing have been implemented. Alternatively, laundry treating apparatuses that may perform, for example, an integrated washing and drying function or an integrated storing and ironing function have also been implemented.

In particular, laundry treating apparatuses for performing washing are largely classified into two types according to a washing method. Specifically, the types of the laundry treating apparatuses may be classified according to whether a rotating cylindrical washing tub is vertically or horizontally disposed. The laundry treating apparatus in which the washing tub is horizontally disposed is called a drum-type, and the laundry treating apparatus in which the washing tub is vertically disposed is called a pulsator-type (or volute-type) or agitator-type.

The above two types of the laundry treating apparatuses differ in terms of a loading direction of laundry or a direction of a rotation axis of an inner tub, but are similar in terms of a configuration in which an outer tub is provided to receive washing water and the inner tub is rotatably disposed inside the outer tub.

When the laundry, together with washing water, rotates inside the washing tub, vibration occurs repeatedly in the washing tub. Due to this vibration, the washing tub may collide with or come into contact with nearby structures.

Accordingly, vibration dampening devices are installed inside a main body of the laundry treating apparatus, which are configured to dampen vibration occurring in the washing tub while supporting the load of the washing tub.

The vibration dampening devices can enable noise reduction and stable rotation of the inner tub by reducing vibration or shaking occurring in the washing tub.

In this regard, Korean Patent Application Publication No. 10-2012-0072833 (hereinafter referred to as 'Related Art 1') discloses 'a suspension for a washing machine'.

Related Art 1 discloses a body coupled to a tub (an outer tub) of the washing machine and having a buffering space formed therein, a support rod passing through the body to be movable along an axial direction and having a support plate installed at an end thereof, an elastic member arranged to surround the support rod and to allow the support plate to elastically support the body, and a friction member disposed in the buffering space and coming into close contact with an outer circumference of the support rod to generate a frictional force.

However, Related Art 1 has a disadvantage in that since the function of adjusting the frictional force to dampen vibration is not provided and the frictional force value set during the production of the product is maintained, an optimal vibration dampening effect cannot be achieved in all of the washing machines that perform washing in various environments.

In addition, Related Art 1 has a disadvantage in that since the frictional force generated between a rod and the friction member during the use of the washing machine gradually decreases, there is a need to replace the components with new ones as a result.

Korean Patent Application Publication No. 10-2012-0029853 (hereinafter referred to as 'Related Art 2') discloses 'a washing machine'.

Related Art 2 discloses a casing forming the exterior of the washing machine, a support rod having one end coupled to the casing, and a suspension coupling an outer tub to the other end of the support rod such that the outer tub is suspended from the casing in order to dampen vibration of the outer tub. The suspension includes an air cap through which the support rod passes and which moves along the support rod when the outer tub vibrates, a first friction member that is disposed in the air cap to come into contact with an inner surface of the air cap, and a second friction member disposed to come into contact with the support rod.

Related Art 2 has a disadvantage in that when large vibration occurs in the outer tub, since a friction damper comes into contact with the inner wall of the air cap, loud noise may occur.

In addition, Related Art 2 has a disadvantage in that since the first friction member and the second friction member of the friction damper press both the inner surface of the air cap and the support rod, respectively, while positioned between the inner surface of the air cap and the support rod, the air cap is prone to breakage and thus has a relatively low durability.

The above-described background technology is technical information that the inventors have held for the derivation of the present disclosure or that the inventors acquired in the process of deriving the present disclosure. Thus, the above-described background technology cannot be regarded as known technology disclosed to the general public prior to the filing of the present application.

SUMMARY

The present disclosure is directed to addressing a disadvantage in the art in which, although treatments such as washing, rinsing, and spin-drying may be performed in various environments, vibration must be dampened with a frictional force value that was set during the initial production of the product.

The present disclosure is further directed to addressing a disadvantage in the art in which there is a need for variation in frictional force to dampen vibration that may occur due to, for example, differences between materials or tolerances between components during the product production process.

The present disclosure is still further directed to addressing a disadvantage in the art in which noise occurs due to vibration occurring in a washing tub.

The present disclosure is still further directed to addressing a disadvantage in the art in which a number of components must be assembled in a complicated manner to absorb shock or vibration occurring in the washing tub.

The present disclosure is still further directed to addressing a disadvantage in the art in which the components in a damper for absorbing shock or vibration occurring in a washing tub are prone to breakage due to a friction or have a shortened life.

The present disclosure is not limited to what has been disclosed hereinabove. A person skilled in the art may clearly understand, from the following description, other aspects not mentioned above.

In a laundry treating apparatus according to an embodiment of the present disclosure, a friction member is disposed to come into contact with a support rod so as to surround the support rod, and presses the support rod through the coupling of a cap and a housing. Accordingly, a user may adjust a magnitude of a frictional force generated between the friction member and the support rod.

In a laundry treating apparatus according to an embodiment of the present disclosure, in order to reduce noise due to vibration of a washing tub, a damper is configured such that a cap and a housing are coupled to each other through their corresponding rotation, and a friction member disposed in an inner space of the cap presses a support rod through the coupling of the cap and the housing.

In a laundry treating apparatus according to an embodiment of the present disclosure, in order to prevent a reduction of vibration dampening efficiency that may occur due to, for example, tolerances between the components or materials of a friction member, pressing pieces formed in a cap are configured to change a pressing force for pressing the friction member according to a coupling depth of the cap and a housing, and the pressing force of the friction member for pressing a support rod can be easily adjusted by a user.

Specifically, a laundry treating apparatus according to an embodiment of the present disclosure includes a main body, a washing tub, and a suspension assembly. The suspension assembly includes a support rod, an elastic member, and a damper. One end of the support rod is coupled to the main body. The elastic member is arranged about the support rod to surround the support rod. The damper is supported on one end of the elastic member, and is configured to move along the longitudinal direction of the support rod.

The damper includes a cap, a housing, and a friction member.

A washing tub is seated on the cap, and the cap includes a first through hole through which the support rod passes, and a male coupling portion formed on at least a part of an outer surface thereof.

The housing is formed in a cylindrical shape having one closed surface, and includes a female coupling portion formed on an inner circumference of the housing to be coupled to the male coupling portion.

The friction member is disposed in both the cap and the housing, and is configured to press the support rod through the coupling of the female coupling portion and the male coupling portion.

In the laundry treating apparatus according to an embodiment of the present disclosure, the cap includes a mount, a support portion, and a pressing piece. The mount includes an upper surface formed of an inclined and curved surface on which the washing tub is seated, and has an outer diameter that increases downward. The support portion corresponds to a lower surface of the mount, and comes into contact with one end of the elastic member. The male coupling portion is formed on an outer circumference of the pressing piece, and at least two pressure pieces form a pocket for receiving the friction member. In addition, a volume of the pocket is reduced through the coupling of the female coupling portion and the male coupling portion.

In the laundry treating apparatus according to an embodiment of the present disclosure, the male coupling portion is formed on an outer circumference of the pressing piece included in the cap, the friction member is received between at least two pressure pieces, and the pressing piece presses the friction member toward the support rod by reducing the distance between the male coupling portion and the female coupling portion through the coupling of the male coupling portion and the female coupling portion.

In the laundry treating apparatus according to an embodiment of the present disclosure, the male coupling portion and the female coupling portion are coupled to and released from each other through mutual rotation, and are formed of corresponding thread shapes.

In the laundry treating apparatus according to an embodiment of the present disclosure, the housing is formed in a cylindrical shape having one closed end, a space for receiving the pressing piece is formed in the housing, the female coupling portion of a thread shape is formed on an inner circumference of the housing, and the housing includes a second through hole, and a lock plate disposed perpendicular to the longitudinal direction of the support rod.

In the laundry treating apparatus according to an embodiment of the present disclosure, the pressing piece is configured to increase a pressing force of the friction member for pressing the support rod as the cap and the housing move closer to each other through the coupling of the male coupling portion and the female coupling portion.

In the laundry treating apparatus according to an embodiment of the present disclosure, an inner diameter of the female coupling portion is reduced as the female coupling portion moves closer to the lock plate.

In the laundry treating apparatus according to an embodiment of the present disclosure, the lock plate includes an elastic guide disposed on an inner surface of the lock plate. One end of the elastic guide is in contact with the inner surface of the lock plate and the other end thereof is in contact with the friction member, and the elastic guide is interposed between the lock plate and the friction member to be elastically deformable.

In the laundry treating apparatus according to an embodiment of the present disclosure, the lock plate includes a seating portion formed on an inner surface of the lock plate, wherein the seating portion is formed in a circular and annular protrusion that is formed concentrically with the second through hole and that has a larger diameter than the second through hole.

In addition, the laundry treating apparatus according to an embodiment of the present disclosure is a laundry treating apparatus that includes a main body and a washing tub received in the main body, and includes one or more suspension assemblies having a damper and coupling the washing tub to the main body. Here, the damper is coupled to the main body through a coupling portion formed at one end of the damper, is mounted to enable linear movement, and allows the washing tub to be seated on the damper.

The suspension assembly includes a support rod having a coupling portion formed at one end thereof and providing a linear movement path of the damper, and an elastic member mounted to the support rod so as to allow the damper to return to a predetermined position by applying an elastic force to the damper.

In addition, the damper includes a cap, a housing, and a friction member.

The cap is provided with a mount on which the washing tub is seated, is penetrated by the support rod, and forms a pocket corresponding to a predetermined space around the support rod.

The housing is penetrated by the support rod, and is coupled to the cap to reduce the size of the pocket. The friction member is received in the pocket to surround at least a portion of an outer circumference of the support rod.

Alternatively, the laundry treating apparatus according to an embodiment of the present disclosure is a laundry treating apparatus that includes a main body and a washing tub received in the main body, and includes one or more suspension assemblies having a damper and coupling the washing tub to the main body. Here, the damper is coupled to the main body through a coupling portion formed at one end of the damper, is mounted to enable linear movement, and allows the washing tub to be seated on the damper.

The suspension assembly includes a support rod having a coupling portion formed at one end thereof and providing a linear movement path of the damper, and an elastic member mounted to the support rod so as to allow the damper to return to a predetermined position by applying an elastic force to the damper.

The damper includes a cap, a housing, and a friction portion. The cap is provided with a mount on which the washing tub is seated, is penetrated by the support rod, and includes at least two pressing pieces arranged adjacent to the outer circumference of the support rod.

The housing is penetrated by the support rod, and is coupled to the cap to press the pressing pieces toward the support rod.

The friction member is formed between the pressing pieces, and presses the support rod by coming into contact with the support rod through the coupling of the housing and the cap.

In the laundry treating apparatus according to an embodiment of the present disclosure, an odd number of pressing pieces are arranged around a path through which the support rod passes, and the pressing pieces are respectively arranged at regular intervals on a circumference of a virtual circle centered on a center of the support rod.

In the laundry treating apparatus according to an embodiment of the present disclosure, the friction portion includes an uneven portion of which a surface in contact with the support rod is at least partially protruding or recessed.

In the laundry treating apparatus according to an embodiment of the present disclosure, the uneven portion includes a friction reinforcement member that is made of a material having a higher friction coefficient than the pressing piece and that is disposed at a contact position between the uneven portion and the support rod.

According to the embodiments of the present disclosure, since vibration of the washing tub can be dampened by adjusting the frictional force, a suitable vibration dampening efficiency can be obtained according to, for example, an installation location of the laundry treating apparatus and a washing environment.

According to the embodiments of the present disclosure, since it is possible to set the frictional force to dampen vibration of the washing tub during installation or inspection of the washing tub, a variation in frictional force that may occur due to, for example, differences between materials or tolerances between components during the product production process, can be reduced, and a predetermined value of frictional force can be involved in vibration dampening.

According to the embodiments of the present disclosure, since collisions between the components, resulting from the force applied from the washing tub within the suspension assembly supporting the load of the washing tub, can be prevented, noise due to vibration during operation of the washing tub can be reduced.

According to the embodiments of the present disclosure, since the friction member, the cap, and the housing are formed in a simple structure, respectively, the number of components can be reduced, and easy assembly of the components can be facilitated.

According to the embodiments of the present disclosure, since no separate shock is applied during vibration dampening by fixing the friction member through the pressing piece provided in the cap, the durability and lifespan of the product can be increased.

The effects of the present disclose are not limited to those mentioned above, and other effects not mentioned can be clearly understood by those skilled in the art from the following description.

DETAILED DESCRIPTION

Figure 1:
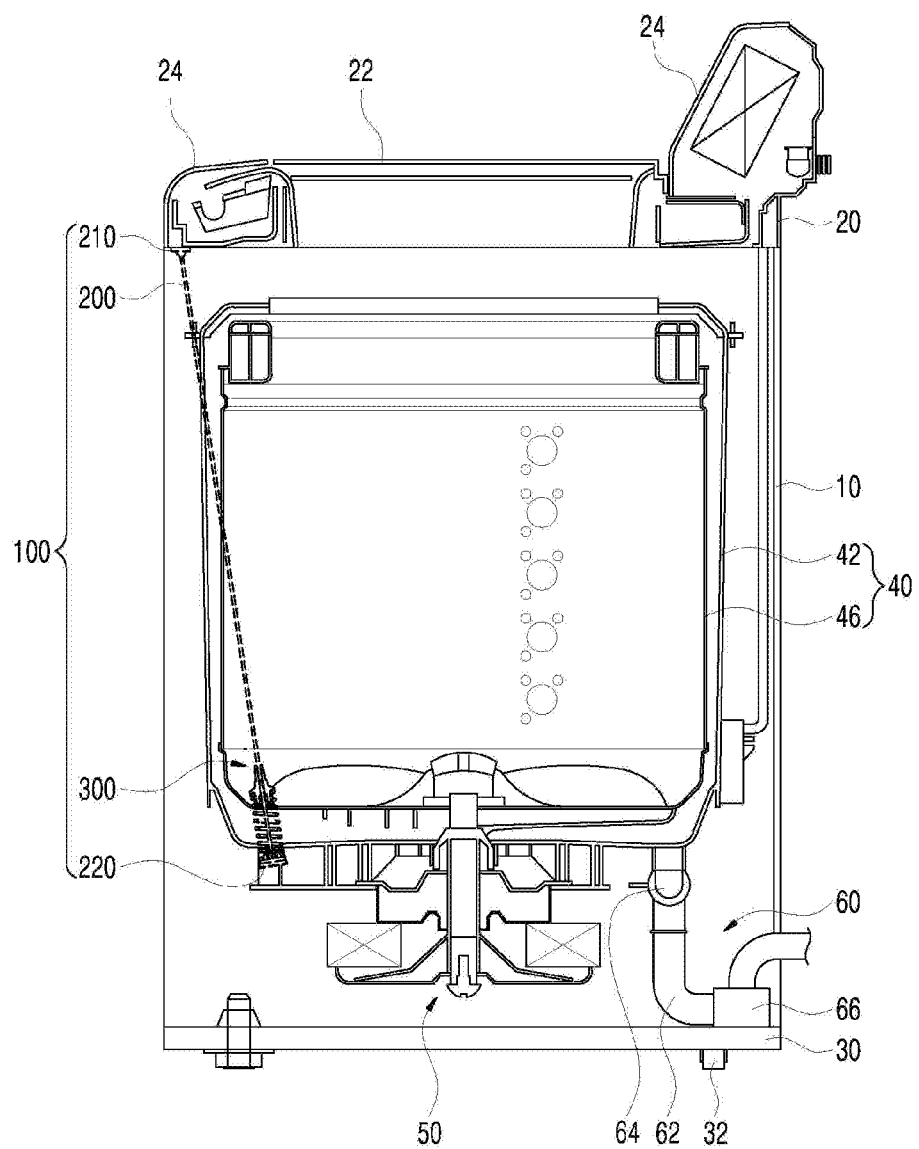
FIG. 1 is a cross-sectional view of a laundry treating apparatus according to an embodiment of the present disclosure.

Hereinafter, the embodiments of the present disclosure as described above will be described in detail with reference to the accompanying drawings. The like reference numerals refer to the like components throughout the detailed description.

FIG. 1 is a cross-sectional view of a laundry treating apparatus according to an embodiment of the present disclosure.

As illustrated in FIG. 1, a main body 10 is coupled to a top cover 20 and a base 30 so as to form the exterior of the laundry treating apparatus according to an embodiment of the present disclosure.

The main body 10 includes a receiving space formed therein. The base 30 is coupled to a bottom surface of the main body 10, and the top cover 20 is coupled to a top surface of the main body 10.

The base 30 supports the load of the main body 10. The base 30 stably fixes the main body 10.

The base 30 includes four legs 32 that protrude downward from a bottom surface of the base 30, and the protruding length of each of the legs 32 may be adjusted.

The level of the base 30 and the main body 10 may be adjusted by adjusting the protruding length of each of the legs 32.

In addition, the base 30 and the main body 10 may be firmly seated on a floor surface without shaking, by adjusting the protruding length of each of the legs 32.

The base 30 and the legs 32 together support the laundry treating apparatus according to an embodiment of the present disclosure, and prevent the shaking or tilting of the laundry treating apparatus by stably transmitting the load of the laundry treating apparatus to the floor surface.

The main body 10 is coupled to the base 30 so as to be seated on the base 30. The main body 10 includes a space formed therein. Components such as a washing tub 40 and a drain portion 60 are installed inside the main body 10.

The top cover 20 is coupled to a top surface of the main body 10. The top cover 20 includes a door 22 that may be opened and closed. The door 22 may be a top-down type, and when the door 22 is opened, the inside of the main body 10, specifically, the washing tub 40 installed inside the main body 10 is opened. When the washing tub 40 is opened through the opening of the door 22, the laundry may be loaded into the washing tub 40.

Subsequently, when the door 22 is closed, the washing tub 40 is isolated from the outside.

The operation of the washing tub 40 in a state in which the door 22 is opened may be prevented through a sensor attached to the door 22. The door 22 may be automatically opened or closed, but this is merely exemplary, and the door 22 may be implemented in an appropriate type according to an embodiment of the present disclosure.

In addition, a control panel 24 may be provided at a position adjacent to the door 22 or at a position easily recognized by a user.

The control panel 24 may include a display and a manipulation portion. A command may be inputted to the laundry treating apparatus according to an embodiment of the present disclosure through an operation such as touching or pressing the manipulation unit. The operating state and information of the laundry treating apparatus may be displayed on the display.

The washing tub 40 is installed in a space inside the main body 10. The washing tub 40 includes an outer tub 42 and an inner tub 46.

The outer tub 42 is coupled to the main body 10 in the space inside the main body 10. The inner tub 46 is received in the outer tub 42. The outer tub 42 is coupled to the main body 10 through a support member 220.

The support member 220 is provided with a damper. Accordingly, although the load of the outer tub 42 is supported on the main body 10, the outer tub 42 may make a predetermined movement relative to the main body 10. As a result, vibration or shock applied to the outer tub 42 may be reduced by means of the support member 220.

Water may be received in the outer tub 42. The outer tub 42 is composed of a bottom surface and a side wall. The inner tub 46 is coupled to the outer tub 42 so as to rotate inside the outer tub 42. When the inner tub 46 rotates inside the outer tub 42, water received in the outer tub 42 generates a predetermined water flow.

The inner tub 46 is sized to be received in the outer tub 42, and is composed of a bottom surface and a side wall. The inner tub 46 is provided with a loading hole that is opened upward.

The bottom surface of the inner tub 46 is coupled to a drive portion 50, such that the inner tub 46 may rotate in a predetermined direction by means of the driving of the drive portion 50.

When water is supplied to the outer tub 42 through a water supply inlet coupled to an external water supply, the outer tub 42 is filled with washing water. Washing water in the outer tub 42 also flows into the inner tub 46 through the opened holes formed in the inner tub 46. When washing or rinsing is performed, washing water received in the outer tub 42 generates a series of water flows by means of rotation of the inner tub 46, and washing or rinsing is performed by the water flows.

When spin-drying or draining is performed, the drain valve 64 is opened, and water received in the outer tub 42 is discharged to the outside through the drain valve 64 and a drain passage 62. The drain passage 62 may further include a separate drain pump 66. The drain pump 66 may serve to allow washing water received in the washing tub 40 to be discharged more smoothly to the outside.

Figure 2:
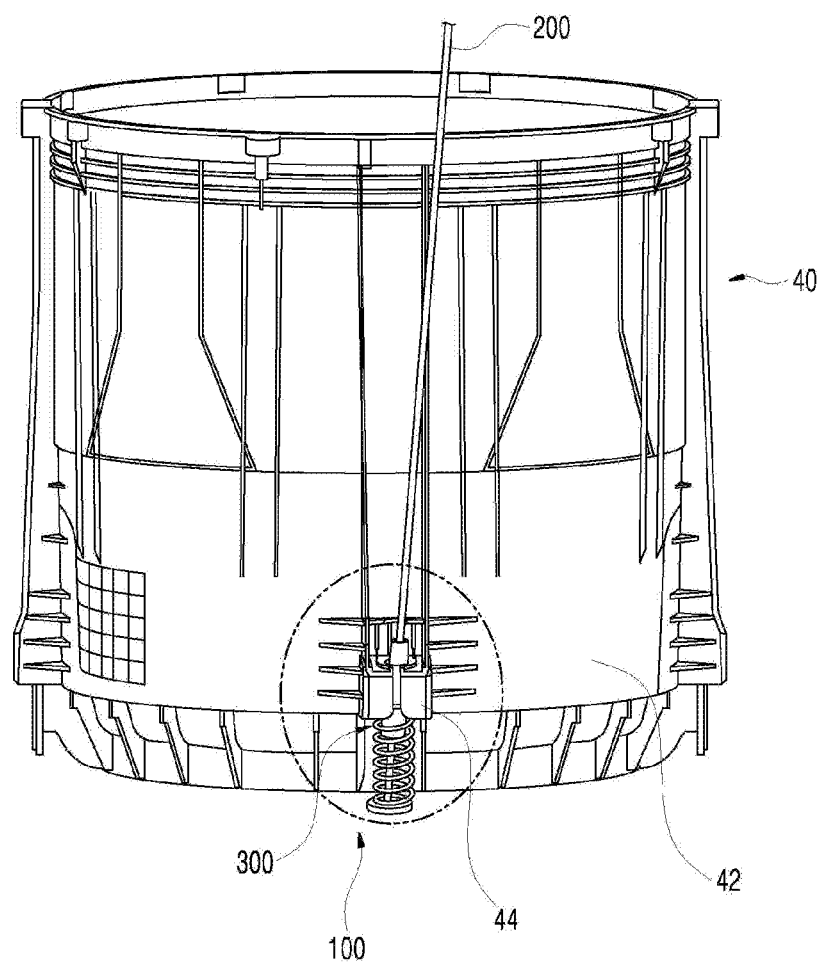
FIG. 2 is a perspective view of a washing tub in a laundry treating apparatus according to an embodiment of the present disclosure.
Figure 3:
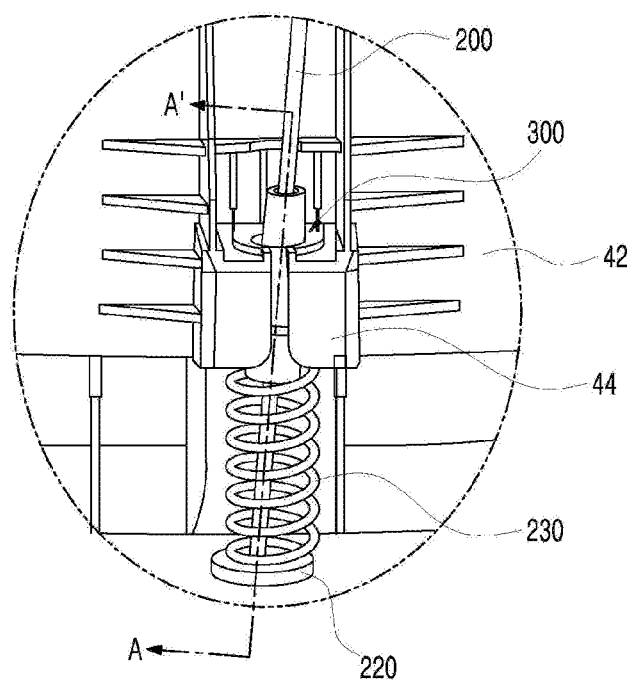
FIG. 3 is a perspective view illustrating a suspension assembly in a laundry treating apparatus according to an embodiment of the present disclosure.

FIG. 2 is a perspective view of the washing tub 40 in the laundry treating apparatus according to an embodiment of the present disclosure, and FIG. 3 is a perspective view illustrating a suspension assembly 100 in the laundry treating apparatus according to an embodiment of the present disclosure.

As illustrated in FIGS. 2 and 3, the washing tub 40 is coupled to the main body 10 inside the main body 10. The main body 10 and the washing tub 40 are coupled to each other through the suspension assembly 100. The washing tub 40 may be coupled to at least one suspension assembly 100. The washing tub 40 is coupled to the main body 10 so as to make a predetermined movement. The washing tub 40 is coupled to the main body 10 at at least two points on the washing tub 40, and the load of the washing tub 40 is supported on the main body 10. In the laundry treating apparatus according to an embodiment of the present disclosure, at least two suspension assemblies 100 are coupled to the outer circumference of the washing tub 40. The suspension assemblies 100 serve to couple the washing tub 40 to the main body 10. The washing tub 40 may be hinged to the main body 10 at one point of the outer circumference of the washing tub 40.

The suspension assembly 100 is interposed between the main body 10 and the washing tub 40 in order to support the load of the washing tub 40 and to absorb vibration occurring in the washing tub 40.

Figure 4:
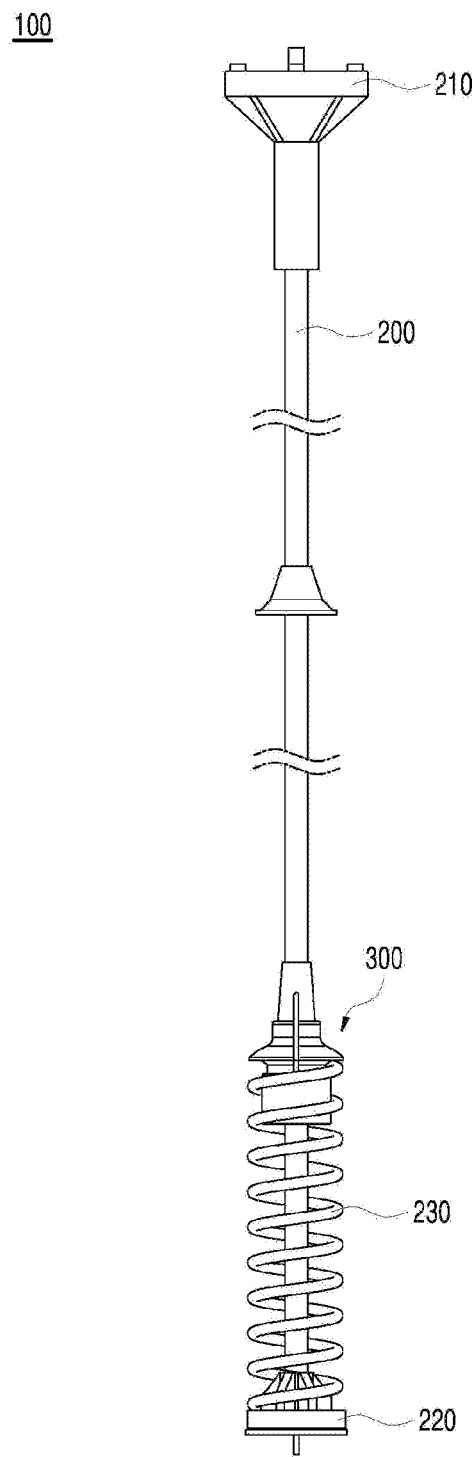
FIG. 4 is front view illustrating a suspension assembly in a laundry treating apparatus according to an embodiment of the present disclosure.
Figure 5:
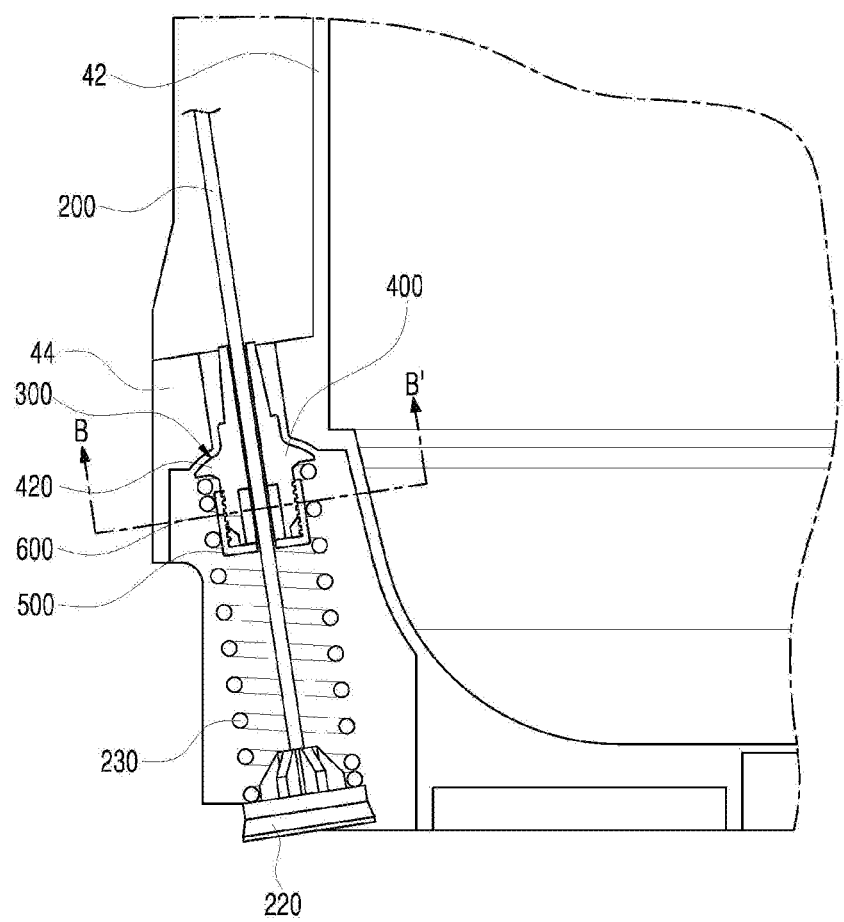
FIG. 5 is a cross-sectional view taken along line A-A' of FIG. 3

FIG. 4 is front view illustrating the suspension assembly 100 in the laundry treating apparatus according to an embodiment of the present disclosure, and FIG. 5 is a cross-sectional view taken along line A-A' of FIG. 3.

As illustrated in FIGS. 4 and 5, the suspension assembly 100 includes a support rod 200, a coupling portion 210, a support member 220, an elastic member 230, and a damper 300.

The coupling portion 210 is disposed at one end of the support rod 200, and the support member 220 is disposed at the other end of the support rod 200. The coupling portion 210 is where the suspension assembly 100 is coupled to the main body 10, and is formed such that the support rod 200 is rotatably coupled to the main body 10.

The support member 220 is formed at the other end of the support rod 200, and is formed with a predetermined width in a direction perpendicular to the longitudinal direction of the support member 220. In the laundry treating apparatus according to an embodiment of the present disclosure, the support member 220 may be formed in a circular plate shape. The support member 220 may be coupled to the other end of the support rod 200, but may have a shape that extends to the outside of the support rod 200.

The elastic member 230 is arranged about the support rod 200 to surround the support rod 200. One end of the elastic member 230 is coupled to the support member 220 to prevent the elastic member 230 from being separated from the support rod 200. For example, the elastic member 230 may be a coil spring.

The elastic member 230 is interposed between the support member 220 and the damper 300. Accordingly, when an external force is applied to the damper 300, the elastic member 230 is compressed, and when the external force applied to the damper 300 is removed, the elastic member 230 returns to its original state.

The support rod 200 may be formed in a rod shape. The support rod 200 has a predetermined length. One end of the support rod 200, which is provided with the coupling portion 210, faces upward, while the other end of the support rod 200, which is provided with the support member 220, faces downward.

The damper 300 is coupled to the support rod 200 to surround the outer circumference of the support rod 200. The damper 300 is configured to slide along the longitudinal direction of the support rod 200. As described above, since the damper 300 comes into contact with the elastic member 230, the damper 300 is affected by the elastic force of the elastic member 230 when moving in one direction.

In addition, a holder 44 is mounted over the damper 300. The holder 44 is formed at the lower portion of the outer tub 42. Specifically, the holder 44 is positioned at the lower portion of the outer circumference of the outer tub 42. The same number of holders 44 as the dampers 300 may be mounted.

The load of the washing tub 40 and vibration occurring in the washing tub 40 are transmitted to the damper 300 through the holder 44. Accordingly, when an external force is applied to the damper 300 through the holder 44, the elastic member 230 is compressed, and the damper 300 reciprocates vertically along the support rod 200 by the elastic force of the elastic member 230.

The damper 300 maintains a predetermined frictional force against the support rod 200. Accordingly, when an external force from the washing tub 40 is applied to the elastic member 230 to press the elastic member 230, the damper 300 moves vertically according to the behavior of the elastic member 230. However, since the frictional force generated between the damper 300 and the support rod 200 attenuates the behavior of the elastic member 230, abrupt movement of the damper 300 is prevented.

That is, the load of the washing tub 40 and the external force generated in the washing tub 40 are transmitted to the damper 300. The damper 300 attenuates the external force transmitted from the washing tub 40. Both the elastic force of the elastic member 230 and the frictional force generated at the coupling position of the damper 300 and the support rod 200 are applied to the damper 300. Since the elastic force and the frictional force are simultaneously applied to the damper 300, a buffering effect occurs in the damper 300.

Figure 6:
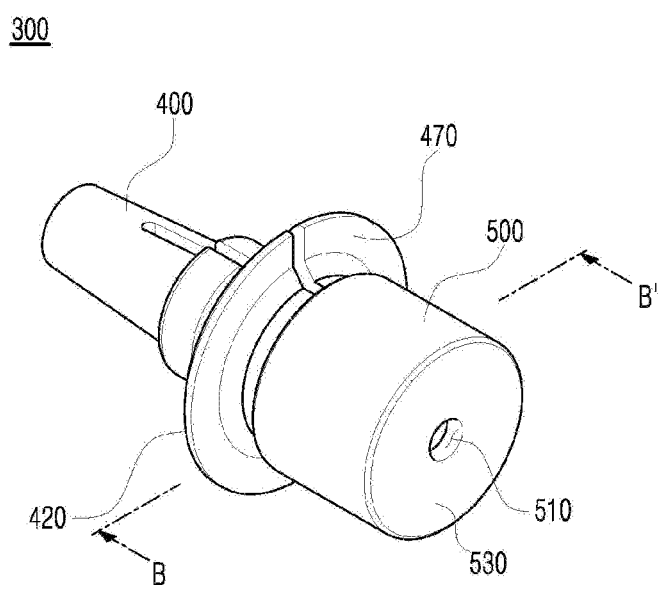
FIG. 6 is a perspective view of a damper in a laundry treating apparatus according to an embodiment of the present disclosure.
Figure 7:
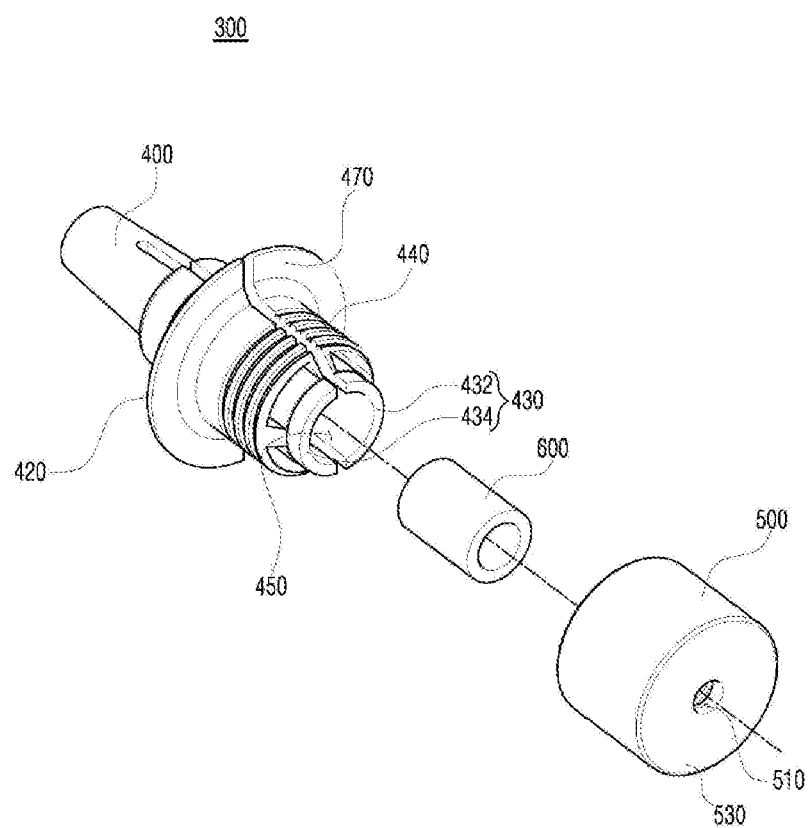
FIG. 7 is an exploded perspective view of a damper in a laundry treating apparatus according to an embodiment of the present disclosure.
Figure 8:
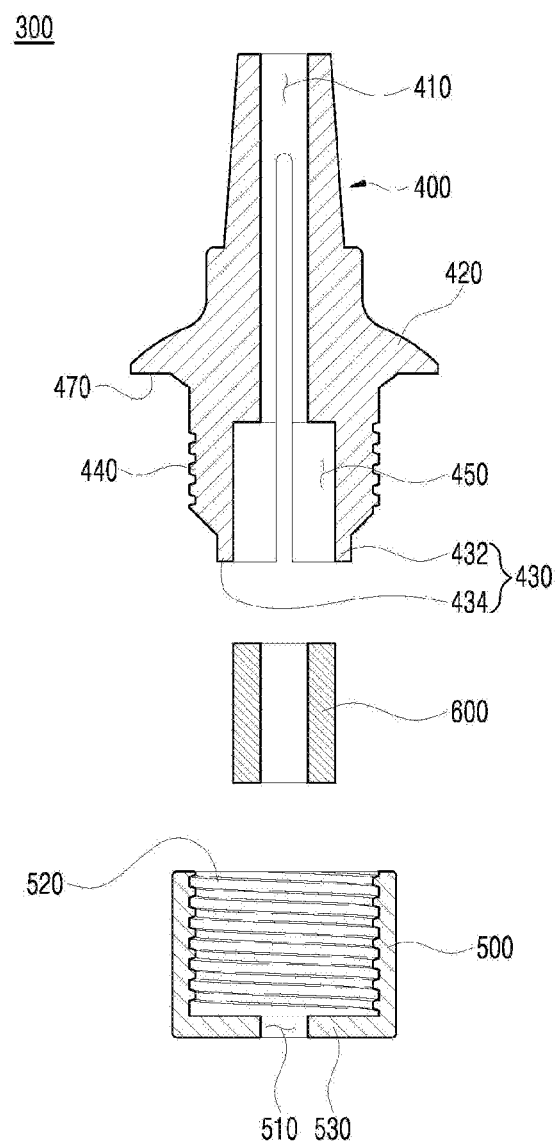
FIG. 8 is a cross-sectional view of a damper in a laundry treating apparatus according to an embodiment of the present disclosure.

FIG. 6 is a perspective view of the damper 300 in the laundry treating apparatus according to an embodiment of the present disclosure, FIG. 7 is an exploded perspective view of the damper 300 in the laundry treating apparatus according to an embodiment of the present disclosure, and FIG. 8 is a cross-sectional view of the damper 300 in the laundry treating apparatus according to an embodiment of the present disclosure.

As illustrated FIGS. 6 to 8, the damper 300 may include a cap 400, a housing 500, and a friction member 600.

The cap 400 and the housing 500 may be coupled to each other through their corresponding rotation. The cap 400 and the housing 500 are penetrated by the support rod 200. In other words, the support rod 200 penetrates both the cap 400 and the housing 500. The cap 400 and the housing 500 may be coupled to each other through their corresponding rotation using, as a rotation axis, a virtual straight line corresponding to the central axis of the support rod 200.

First, the cap 400 is provided with a first through hole 410 through which the support rod 200 may pass. The outer shape of the cap 400 extends laterally about the first through hole 410. The cap 400 includes a mount 420, and the outer shape of the mount 420 extends laterally more than the other portion of the cap 400 about the support rod 200 that passes through the first through hole 410. The mount 420 may have an upper surface formed of a gradually curved surface, and may protrude due to an outer diameter that laterally increases downward.

In the laundry treating apparatus according to an embodiment of the present disclosure, the mount 420 may be formed in a disc shape having a diameter that increases downward. The holder 44 of the washing tub 40 is seated on the mount 420 to support the load of the washing tub 40.

The bottom surface of the mount 420 is provided with a support portion 470 which applies an elastic force by coming into contact with one end of the elastic member 230. Since the elastic member 230 receives or transmits force from or to the support portion 470 formed on the bottom surface of the mount 420, the elastic member 230 may allow the damper 300 to slide along the support rod 200.

In addition, at least two incision portions may be formed in the cap 400 along the longitudinal direction of the support rod 200 about the support rod 200 coupled to the cap 400, and the cap 400 includes a pressing piece 430 of which an outer shape is separated into at least two portions about the incision portion.

The pressing piece 430 may be formed by dividing an outer shape of a part of the cap 400 into at least two portions and extending the at least two portions from the cap 400 along the longitudinal direction of the support rod 200. In the laundry treating apparatus according to an embodiment of the present disclosure, the respective pressing pieces 430 are referred to as a first pressing piece 432, a second pressing piece 434, and a third pressing piece 436.

A male coupling portion 440 is formed on an outer circumference of each of the pressing pieces 430. The male coupling portion 440 may be formed of a thread shape. In addition, the pressing pieces 430 form a pocket 450 which is a predetermined space therein.

The friction member 600 may be received in the pocket 450.

The friction member 600 is made of a material such as rubber, fiber, or felt, which has a high friction coefficient while being able to deform in appearance to some extent.

The friction member 600 is received in the pocket 450 while surrounding at least a portion of the outer circumference of the support rod 200. In some examples, the friction member 600 has a cylindrical shape.

The housing 500 may be formed in a cylindrical shape having one closed surface. The housing 500 may include a side wall that extends from a lock plate 530 corresponding to the closed surface in one direction at an outer circumference of the lock plate 530, and a female coupling portion 520 may be formed on the inner surface of the side wall. A second through hole 510 through which the support rod 200 may pass is formed in the center of the lock plate 530.

The female coupling portion 520 and the male coupling portion 440 may be formed of corresponding thread shapes in order to mesh with each other.

Accordingly, as the friction member 600 is received in the pocket 450 formed in the cap 400 and the male coupling portion 440 is coupled to the female coupling portion 520, the pressing pieces 430 press the friction member 600 toward the support rod 200 through the coupling of the male coupling portion 440 and the female coupling portion 520.

One surface of the pocket 450 is closed by the lock plate 530, and the inner surface of the lock plate 530 is formed to push one end of the friction member 600 so as to cause the friction member 600 to compress the support rod 200 inside the pocket 450.

At this time, the inner diameter of the female coupling portion 520 formed in the housing 500 becomes smaller toward the lock plate 530. This generates differences in force of the pressing pieces 430 for pressing the friction member 600 toward the support rod 200, according to the coupling depth of the male coupling portion 440 and the female coupling portion 520.

That is, the deeper the coupling between the male coupling portion 440 and the female coupling portion 520 is, the stronger the force with which the pressing pieces 430 press the friction member 600 toward the support rod 200 is. This ultimately allows the frictional force generated between the friction member 600 and the support rod 200 to be adjusted.

Figure 9:
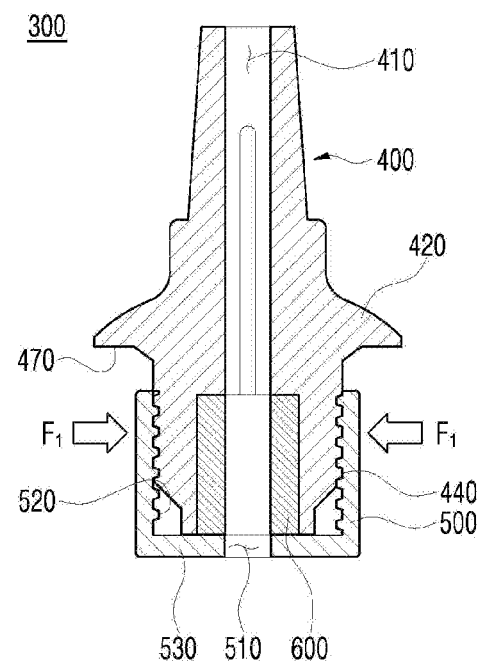
FIGS. 9 and 10 are cross-sectional views illustrating a state in which a cap and a housing are coupled to each other in a laundry treating apparatus according to an embodiment of the present disclosure.
Figure 10:
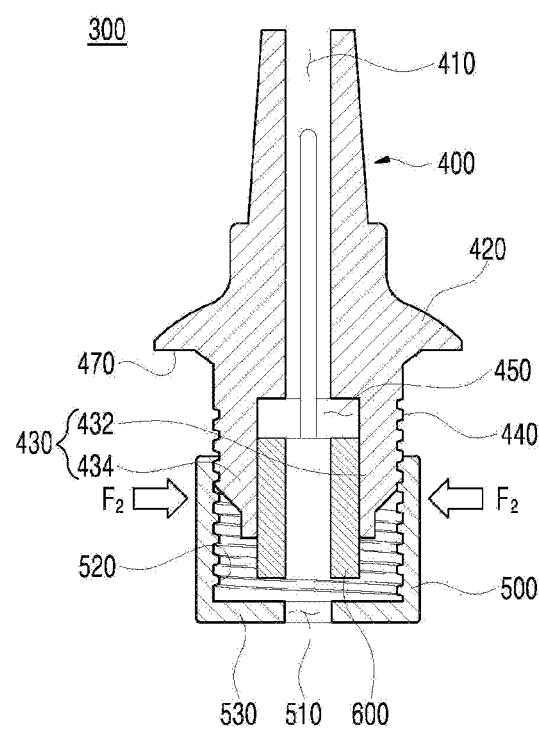

FIGS. 9 and 10 are cross-sectional views illustrating a state in which the cap 400 and the housing 500 are coupled to each other in the laundry treating apparatus according to an embodiment of the present disclosure.

As illustrated in FIGS. 9 and 10, the coupling depth of the housing 500 and the cap 400 may be determined according to the rotation of the housing 500 in one direction.

As illustrated in FIG. 9, when the male coupling portion 440 deeply enters and is coupled to the female coupling portion 520, a force F1 by which the pressing pieces 430 press the friction member 600 toward the support rod 200 is generated. In addition, as illustrated in FIG. 10, when only a part of the male coupling portion 440 enters and is coupled to the female coupling portion 520, a force F2 by which the pressing pieces 430 press the friction member 600 toward the support rod 200 is generated.

Here, F1>F2, and the friction member 600 compressing the support rod 200 with a greater force exerts a greater frictional force.

In addition, the influence range of the force F1 or F2 applied to the outer circumference of the friction member 600 changes according to the coupling depth of the cap 400 and the housing 500. Accordingly, the magnitude of the frictional force generated between the support rod 200 and the friction member 600 also changes.

As a result, the frictional force of the friction member 600 applied to the support rod 200 changes according to the coupling depth of the cap 400 and the housing 500, and thus can be arbitrarily adjusted by a user.

Figure 11:
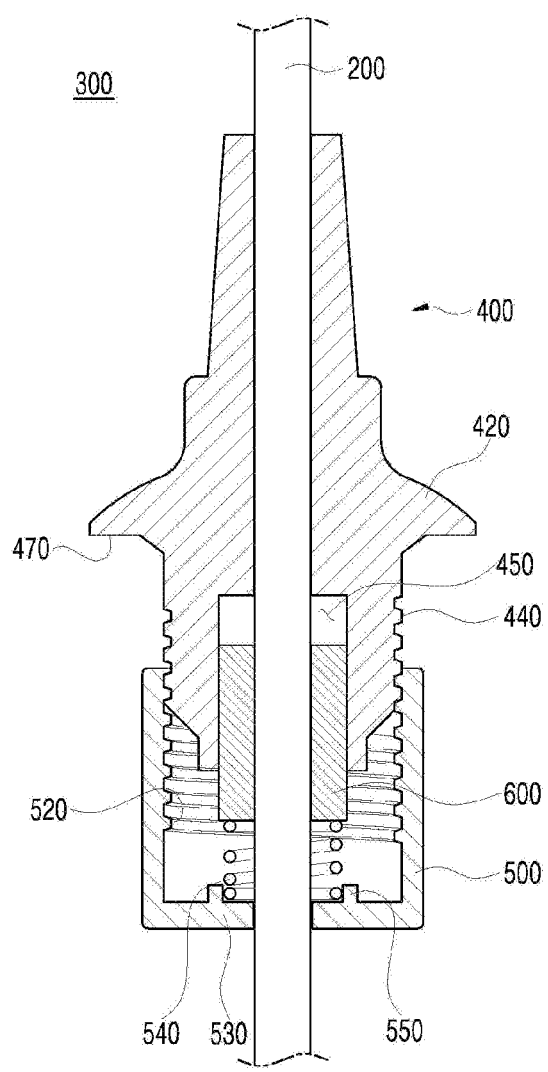
FIGS. 11 and 12 are cross-sectional views illustrating a state in which an elastic guide is additionally included in a damper in a laundry treating apparatus according to an embodiment of the present disclosure.
Figure 12:
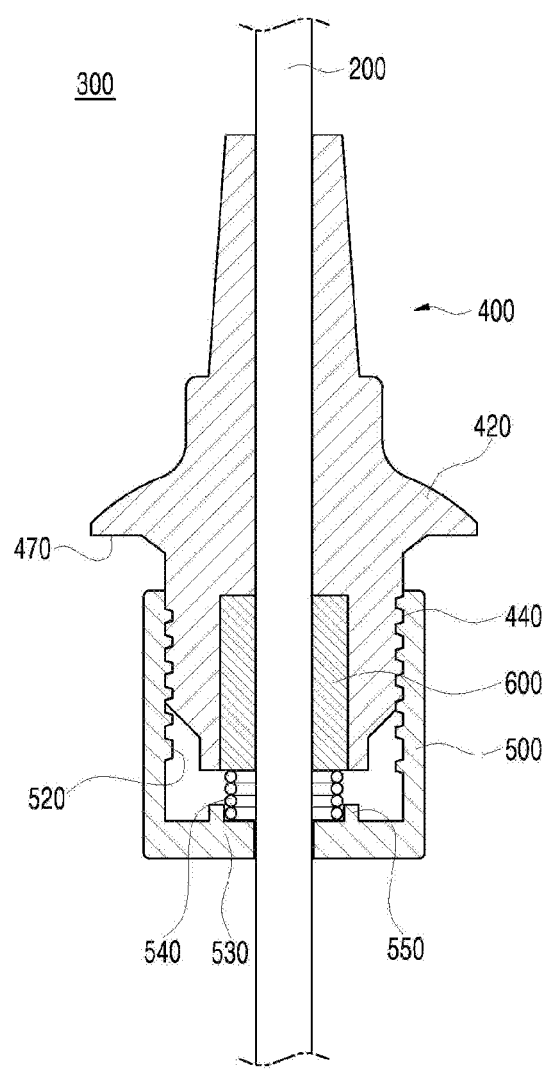

FIGS. 11 and 12 are cross-sectional views illustrating a state in which an elastic guide 540 is additionally included in a damper 300 in the laundry treating apparatus according to an embodiment of the present disclosure.

As illustrated FIGS. 11 and 12, the housing 500 may further include the elastic guide 540. The elastic guide 540 is supported on the lock plate 530 by bringing one end of the elastic guide 540 into contact with the inner surface of the lock plate 530, and pushes the friction member 600 toward the pocket 450 by bringing the other end of the elastic guide 540 into contact with the friction member 600. For example, the elastic guide 540 may be a coil spring.

Therefore, the elastic guide 540 guides the friction member 600 to allow the friction member 600 to be positioned inside the pocket 450 and restricts the movement of the friction member 600, such that the frictional force between the friction member 600 and the support rod 200 may be improved.

The inside of the lock plate 530 is provided with a predetermined space about the second through hole 510 through which the support rod passes, such that a seating portion 550 at which one end of the elastic guide 540 is seated may be formed. The seating portion 550 may be formed by recessing a part of the inner surface of the lock plate 530. Alternatively, as illustrated, the seating portion 550 may be formed by protruding a part of the inner surface of the lock plate 530.

Figure 13:
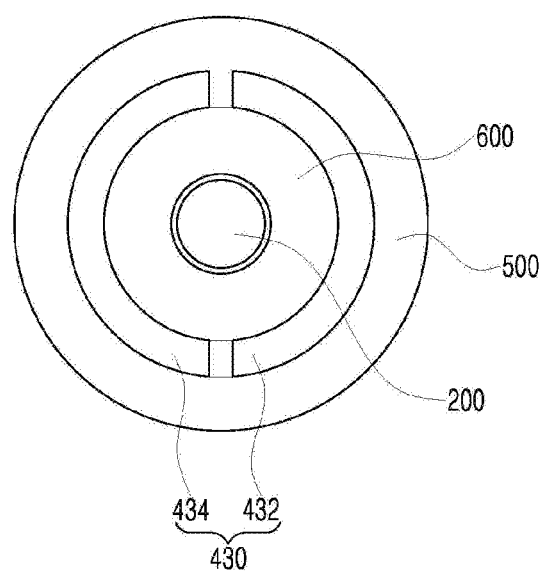
FIGS. 13 and 14 are cross-sectional views taken along line B-B' of FIG. 6, and are cross-sectional views illustrating different embodiments in which different numbers of pressing pieces are provided.
Figure 14:
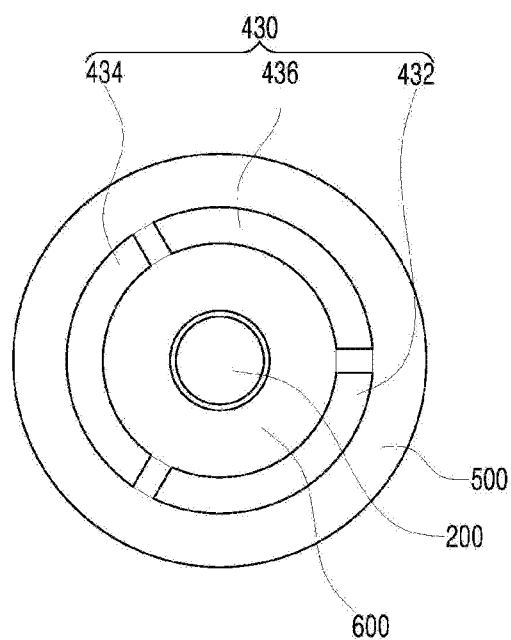

FIGS. 13 and 14 are cross-sectional views taken along line B-B' of FIG. 6, and are cross-sectional views illustrating different embodiments in which different numbers of pressing pieces 430 are provided.

As illustrated FIGS. 13 and 14, two or more pressing pieces 430 may be provided.

FIG. 13 illustrates a state in which an even number of pressing pieces 430, for example, two, are provided, and FIG. 14 illustrates a state in which an odd number of pressing pieces 430, for example, three, are provided.

When the pressing piece 430 is composed of an even number of pressing pieces, that is, the first pressing piece 432 and the second pressing piece 434, the first pressing piece 432 and the second pressing piece 434 are arranged to face each other. This is intended to uniformly distribute the pressure applied to the friction member 600 in the process of pressing the friction member 600 by pushing the pressing piece 430 inward through coupling to the housing 500 and the cap 400.

When the pressing piece 430 is composed of an odd number of pressing pieces, that is, the first pressing piece 432, the second pressing piece 434, and the third pressing piece 436, with respect to a virtual circle having the center of the support rod 200 as its center point, the first pressing piece 432, the second pressing piece 434, and the third pressing piece 436 are arranged at regular intervals on the circumference of the virtual circle. This is also intended to uniformly apply the pressure to the outer surface of the friction member 600 in the process of pressing the outer surface of the friction member 600 inward by the pressing pieces 430 through the coupling of the housing 500 and the cap 400.

Figure 15:
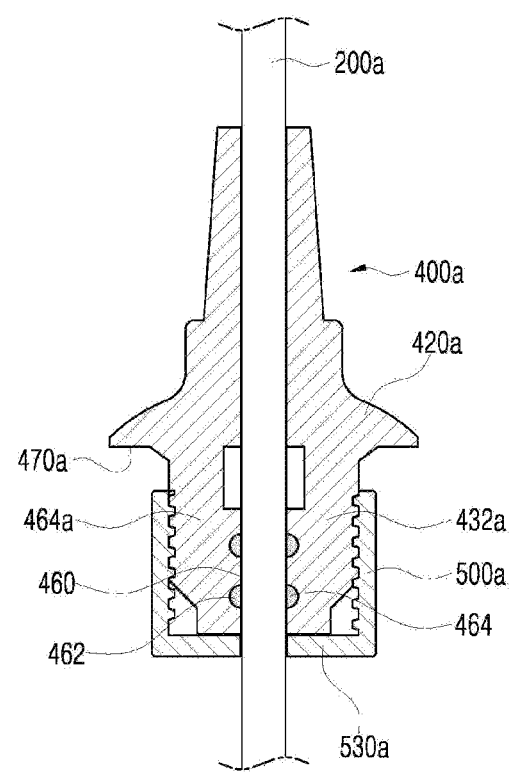
FIG. 15 is a cross-sectional view illustrating a damper in a laundry treating apparatus according to another embodiment of the present disclosure.

FIG. 15 is a cross-sectional view illustrating the damper in the laundry treating apparatus according to another embodiment of the present disclosure.

As illustrated in FIG. 15, a friction portion 460 may be provided on the inner surfaces of pressing pieces 430a formed in a cap 400a. The friction portion 460 is formed on the inner surface of the pressing piece 430a, and protrudes inward by a predetermined length. Accordingly, when the male coupling portion 440a of the cap 400a enters and is coupled to a female coupling portion 520a of a housing 500a, the pressing pieces 430a enter inward, and the friction portion 460 presses a support rod 200a while coming into contact with the outer circumference of the support rod 200a.

As a result, the friction portions 460 formed on the pressing pieces 430a generate a frictional force by coming into contact with the support rod 200a, and the generated frictional force, together with the elastic member 230, can dampen vibration applied by the washing tub 40.

The friction portion 460 may include an uneven portion 462 of a protruding or recessed shape on the surface in contact with the support rod 200a.

The uneven portion 462 serves to increase the frictional force generated by bringing the friction portion 460 into contact with the outer circumference of the support rod 200a.

In addition, the uneven portion 462 may be formed as a long groove of a predetermined pattern on the friction portion 460, and may be, for example, a recessed annular shape surrounding the outer circumference of the support rod 200a. The uneven portion 462 may be provided with a friction reinforcement member 464 that is made of materials having a relatively high friction coefficient.

The friction reinforcement member 464 may be made of a material such as rubber, fiber, or felt. However, this is merely exemplary, and the friction portion 460 and the uneven portion 462 may be implemented in various materials and shapes according to embodiments to which the present disclosure is applied.

In the above, the embodiments of the present disclosure have been described with reference to the accompanying drawings, but these are exemplary. Therefore, the present disclosure should not be construed as being limited to the embodiments and drawings set forth herein. It will be apparent to those skilled in the art that various other changes and modifications can be made without departing from the spirit and scope of the disclosure. In addition, although not all actions or effects according to the configurations of the embodiments have been explicitly described, it is apparent that predictable actions or effects from the configurations should also be recognized as falling within the spirit and scope of the present disclosure.

What is claimed is:

1. A laundry treating apparatus comprising:
a main body that defines a receiving space therein;
a washing tub disposed in the receiving space; and
one or more suspension assemblies that couple the washing tub to the main body and are configured to support the washing tub on the main body,
wherein the one or more suspension assemblies comprise:
a support rod coupled to the main body,
an elastic member that is arranged about the support rod and surrounds the support rod, and
a damper disposed at an end of the elastic member and configured to move along a longitudinal direction of the support rod, the damper comprising:
a cap that comprises a male coupling portion disposed at an outer surface of the cap, that defines a first through hole receiving the support rod, and that is configured to support the washing tub,
a housing that has a cylindrical shape, that defines an opened top surface configured to receive the cap, and that comprises a female coupling portion disposed at an inner circumferential surface of the housing and configured to couple to the male coupling portion of the cap, the housing defining a second through hole receiving the support rod, and
a friction member disposed in the cap and the housing, the friction member being configured to press the support rod based on coupling of the female coupling portion and the male coupling portion, and
wherein the cap further comprises:
a mount having an upper surface that is configured to support the washing tub and is curved or inclined with respect to the longitudinal direction of the support rod, wherein an outer diameter of the mount increases downward toward the housing, a support portion that defines a lower surface of the mount and contacts the end of the elastic member, and
a pressing piece that defines the outer surface of the cap including the male coupling portion, the pressing piece comprising at least two pressure pieces that receive the friction member therebetween and are configured to, based on coupling of the male coupling portion and the female coupling portion, press the friction member toward the support rod by reducing a distance between the male coupling portion and the female coupling portion.

2. A laundry treating apparatus comprising:
a main body that defines a receiving space therein;
a washing tub disposed in the receiving space; and
one or more suspension assemblies that couple the washing tub to the main body and are configured to support the washing tub on the main body,
wherein the one or more suspension assemblies comprise:
a support rod coupled to the main body,
an elastic member that is arranged about the support rod and surrounds the support rod, and
a damper disposed at an end of the elastic member and configured to move along a longitudinal direction of the support rod, the damper comprising:
a cap that comprises a male coupling portion disposed at an outer surface of the cap, that defines a first through hole receiving the support rod, and that is configured to support the washing tub,
a housing that has a cylindrical shape, that defines an opened top surface configured to receive the cap, and that comprises a female coupling portion disposed at an inner circumferential surface of the housing and configured to couple to the male coupling portion of the cap, the housing defining a second through hole receiving the support rod, and
a friction member disposed in the cap and the housing, the friction member being configured to press the support rod based on coupling of the female coupling portion and the male coupling portion, and
wherein the cap comprises:
a mount having an upper surface that is configured to support the washing tub and is curved or inclined with respect to the longitudinal direction of the support rod, wherein an outer diameter of the mount increases downward toward the housing,
a support portion that defines a lower surface of the mount and contacts the end of the elastic member, and
a pressing piece that defines the outer surface of the cap including the male coupling portion, the pressing piece comprising at least two pressure pieces that define a pocket receiving the friction member therein and are configured to reduce a volume of the pocket based on coupling of the female coupling portion and the male coupling portion.

3. The laundry treating apparatus according to claim 1, wherein the male coupling portion comprises a first thread, and the female coupling portion comprises a second thread, the first and second threads being configured to couple to and release from each other by rotation of the cap or the housing.

4. The laundry treating apparatus according to claim 3, wherein the housing defines a space receiving the pressing piece, and comprises a lock plate that is disposed at a bottom surface of the housing and that extends perpendicular to the longitudinal direction of the support rod, and
wherein the second thread of the female coupling portion is defined at the inner circumferential surface of the housing.

5. The laundry treating apparatus according to claim 4, wherein the pressing piece is configured to, based on the cap and the housing moving closer to each other by coupling of the male coupling portion and the female coupling portion, increase a pressing force of the friction member applied to the support rod.

6. The laundry treating apparatus according to claim 5, wherein an inner diameter of the housing decreases in a direction away from the lock plate.

7. The laundry treating apparatus according to claim 4, wherein the damper further comprises an elastic guide disposed between an inner surface of the lock plate and the friction member and configured to elastically deform, the elastic guide having a first end in contact with the inner surface of the lock plate and a second end in contact with the friction member.

8. The laundry treating apparatus according to claim 7, wherein the lock plate comprises a seating protrusion that protrudes from the inner surface of the lock plate, the seating protrusion having an annular shape that is concentric with the second through hole, and
wherein a diameter of the seating protrusion is greater than a diameter of the second through hole.

9. The laundry treating apparatus according to claim 1, wherein at least a portion of the cap is disposed inside the housing, and
wherein the cap defines a pocket that is configured to receive at least a portion of the friction member, the pocket being in communication with the first through hole.

10. The laundry treating apparatus according to claim 1, wherein the friction member has a cylindrical shape and defines a through hole receiving the support rod, and wherein the friction member has:
an outer circumferential surface in contact with an inner circumferential surface of the cap; and
an inner circumferential surface in contact with an outer circumferential surface of the support rod.

11. The laundry treating apparatus according to claim 1, wherein the friction member is configured to move along the longitudinal direction of the support rod.

12. The laundry treating apparatus according to claim 1, wherein the elastic member comprises a coil spring that is disposed between the main body and the washing tub and that surrounds the support rod, the housing, and the cap.

13. The laundry treating apparatus according to claim 7, wherein the elastic guide comprises a coil spring that is disposed inside the housing between the inner surface of the lock plate and the friction member.

14. A laundry treating apparatus comprising:
a main body that defines a receiving space therein;
a washing tub disposed in the receiving space; and
one or more suspension assemblies that couple the washing tub to the main body and are configured to support the washing tub on the main body,
wherein the one or more suspension assemblies comprise:
a support rod coupled to the main body,
an elastic member that is arranged about the support rod and surrounds the support rod, and
a damper disposed at an end of the elastic member and configured to move along a longitudinal direction of the support rod, the damper comprising:
a cap comprising (i) a mount that supports the washing tub and (ii) a plurality of pressing pieces that face an outer circumference of the support rod, the support rod passing through a path defined between the plurality of pressing pieces,
a housing through which the support rod passes, the housing being configured to press the plurality of pressing pieces toward the support rod based on coupling to the cap, and
a friction portion that faces the plurality of pressing pieces and is configured to press the support rod by coming into contact with the support rod based on the housing coupling to the cap,
wherein the friction portion further comprises:
an uneven portion that protrudes or is recessed from a surface in contact with the support rod, and
a friction reinforcement member that is disposed at a contact position between the uneven portion and the support rod and that is made of a material having a higher friction coefficient than the plurality of pressing pieces.

15. The laundry treating apparatus according to claim 14, wherein the plurality of pressing pieces are an even number of pressing pieces that are arranged around the outer circumference of the support rod and that define the path through which the support rod passes.

16. The laundry treating apparatus according to claim 14, wherein the plurality of pressing pieces are an odd number of pressing pieces that are arranged around the outer circumference of the support rod, that define the path through which the support rod passes, and that are arranged with regular intervals along a virtual circle defined about a center of the support rod.

* * * * *